US010762048B2

(12) United States Patent
Nguyen et al.

(10) Patent No.: US 10,762,048 B2
(45) Date of Patent: Sep. 1, 2020

(54) DYNAMICALLY INCREASING AVAILABLE STORAGE SPACE IN A STORAGE VOLUME

(71) Applicant: International Business Machines Corporation, Armonk, NY (US)

(72) Inventors: Tan Q. Nguyen, San Jose, CA (US); Tony Xu, Sunnyvale, CA (US); John R. Paveza, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/259,522

(22) Filed: Jan. 28, 2019

(65) Prior Publication Data
US 2020/0242084 A1 Jul. 30, 2020

(51) Int. Cl.
*G06F 12/02* (2006.01)
*G06F 16/17* (2019.01)
*G06F 3/06* (2006.01)

(52) U.S. Cl.
CPC .......... *G06F 16/1727* (2019.01); *G06F 3/064* (2013.01); *G06F 3/0607* (2013.01); *G06F 3/067* (2013.01); *G06F 3/0631* (2013.01); *G06F 3/0643* (2013.01); *G06F 12/023* (2013.01)

(58) Field of Classification Search
CPC ............... G06F 12/0253; G06F 3/0611; G11C 16/3495
See application file for complete search history.

(56) References Cited

U.S. PATENT DOCUMENTS

| | | | |
|---|---|---|---|
| 6,591,334 B1 | 7/2003 | Shyam et al. | |
| 8,166,257 B1 | 4/2012 | Holl, II et al. | |
| 8,219,777 B2 | 7/2012 | Jacobson et al. | |
| 9,256,603 B1 | 2/2016 | Bono et al. | |
| 9,443,591 B2 | 9/2016 | Baryudin et al. | |
| 2009/0193182 A1* | 7/2009 | Nitta | G06F 3/0611 711/103 |

(Continued)

FOREIGN PATENT DOCUMENTS

EP 2107737 A1 10/2009

OTHER PUBLICATIONS

Jain et al., "Working Efficiently with Large SAS® Datasets", PhUSE 2010, pp. 8 https://www.lexjansen.com/phuse/2010/cc/CC03.pdf.

*Primary Examiner* — Ryan Bertram
*Assistant Examiner* — Trang K Ta
(74) *Attorney, Agent, or Firm* — Zilka-Kotab, P.C.

(57) ABSTRACT

A computer-implemented method according to one embodiment includes receiving a request for a creation or expansion of a file within a predetermined volume of a system, determining that a first amount of available space within the predetermined volume is insufficient to allow the creation or expansion of the file within the predetermined volume of the system, expanding the first amount of available space within the predetermined volume to create a second amount of available space that is greater than the first amount of available space, in response to determining that the first amount of available space is insufficient, and implementing the creation or expansion of the file within the predetermined volume of the system, utilizing the second amount of available space within the predetermined volume.

11 Claims, 4 Drawing Sheets

(56) References Cited

U.S. PATENT DOCUMENTS

| | | | |
|---|---|---|---|
| 2014/0143516 A1* | 5/2014 | Dawson | G06F 12/0253 |
| | | | 711/171 |
| 2016/0011818 A1* | 1/2016 | Hashimoto | G11C 16/3495 |
| | | | 711/103 |
| 2017/0177222 A1* | 6/2017 | Singh | G06F 3/061 |

* cited by examiner

DYNAMICALLY INCREASING AVAILABLE STORAGE SPACE IN A STORAGE VOLUME

BACKGROUND

The present invention relates to data creation and expansion, and more specifically, this invention relates to expanding an amount of available space within a storage volume.

There are important activities or transactions that are desired to be completed by a computing system at a critical time. For example, an entry may need to be committed to a log in a timely manner in order to avoid problems with an associated application. If a volume selected for the activity or transaction is full or does not have enough space to fulfill the requested action, then such action may fail. For example, if the log to which the entry is to be committed is full, the log may need to be extended so that the entry may be committed to the log in order to avoid an associated application failure or other operation issue.

However, current methods for adjusting a volume are scheduled or require manual intervention, and are therefore not time-sensitive and dynamic.

SUMMARY

A computer-implemented method according to one embodiment includes receiving a request for a creation or expansion of a file within a predetermined volume of a system, determining that a first amount of available space within the predetermined volume is insufficient to allow the creation or expansion of the file within the predetermined volume of the system, expanding the first amount of available space within the predetermined volume to create a second amount of available space that is greater than the first amount of available space, in response to determining that the first amount of available space is insufficient, and implementing the creation or expansion of the file within the predetermined volume of the system, utilizing the second amount of available space within the predetermined volume.

According to another embodiment, a computer program product for dynamically increasing available storage space in a storage volume includes a computer readable storage medium having program instructions embodied therewith, where the computer readable storage medium is not a transitory signal per se, and where the program instructions are executable by a processor to cause the processor to perform a method including receiving, by the processor, a request for a creation or expansion of a file within a predetermined volume of a system, determining, by the processor, that a first amount of available space within the predetermined volume is insufficient to allow the creation or expansion of the file within the predetermined volume of the system, expanding, by the processor, the first amount of available space within the predetermined volume to create a second amount of available space that is greater than the first amount of available space, in response to determining that the first amount of available space is insufficient, and implementing, by the processor, the creation or expansion of the file within the predetermined volume of the system, utilizing the second amount of available space within the predetermined volume.

According to another embodiment, a system includes a processor, and logic integrated with the processor, executable by the processor, or integrated with and executable by the processor, where the logic is configured to receive a request for a creation or expansion of a file within a predetermined volume of the system, determine that a first amount of available space within the predetermined volume is insufficient to allow the creation or expansion of the file within the predetermined volume of the system, expand the first amount of available space within the predetermined volume to create a second amount of available space that is greater than the first amount of available space, in response to determining that the first amount of available space is insufficient; and implement the creation or expansion of the file within the predetermined volume of the system, utilizing the second amount of available space within the predetermined volume.

Other aspects and embodiments of the present invention will become apparent from the following detailed description, which, when taken in conjunction with the drawings, illustrate by way of example the principles of the invention.

DETAILED DESCRIPTION

The following description discloses several preferred embodiments of systems, methods and computer program products for dynamically increasing available storage space in a storage volume. Various embodiments provide a method to expand a first amount of available space within a predetermined volume to create a second amount of available space that is greater than the first amount of available space, in response to determining that the first amount of available space is insufficient for performing a creation or expansion of a file.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for dynamically increasing available storage space in a storage volume.

In one general embodiment, a computer-implemented method includes receiving a request for a creation or expansion of a file within a predetermined volume of a system, determining that a first amount of available space within the predetermined volume is insufficient to allow the creation or expansion of the file within the predetermined volume of the system, expanding the first amount of available space within the predetermined volume to create a second amount of available space that is greater than the first amount of available space, in response to determining that the first amount of available space is insufficient, and implementing the creation or expansion of the file within the predetermined volume of the system, utilizing the second amount of available space within the predetermined volume.

In another general embodiment, a computer program product for dynamically increasing available storage space in a storage volume includes a computer readable storage medium having program instructions embodied therewith, where the computer readable storage medium is not a transitory signal per se, and where the program instructions are executable by a processor to cause the processor to perform a method including receiving, by the processor, a request for a creation or expansion of a file within a predetermined volume of a system, determining, by the processor, that a first amount of available space within the predetermined volume is insufficient to allow the creation or expansion of the file within the predetermined volume of the system, expanding, by the processor, the first amount of available space within the predetermined volume to create a second amount of available space that is greater than the first amount of available space, in response to determining that the first amount of available space is insufficient, and implementing, by the processor, the creation or expansion of the file within the predetermined volume of the system, utilizing the second amount of available space within the predetermined volume.

In another general embodiment, a system includes a processor, and logic integrated with the processor, executable by the processor, or integrated with and executable by the processor, where the logic is configured to receive a request for a creation or expansion of a file within a predetermined volume of the system, determine that a first amount of available space within the predetermined volume is insufficient to allow the creation or expansion of the file within the predetermined volume of the system, expand the first amount of available space within the predetermined volume to create a second amount of available space that is greater than the first amount of available space, in response to determining that the first amount of available space is insufficient; and implement the creation or expansion of the file within the predetermined volume of the system, utilizing the second amount of available space within the predetermined volume.

Figure 1:
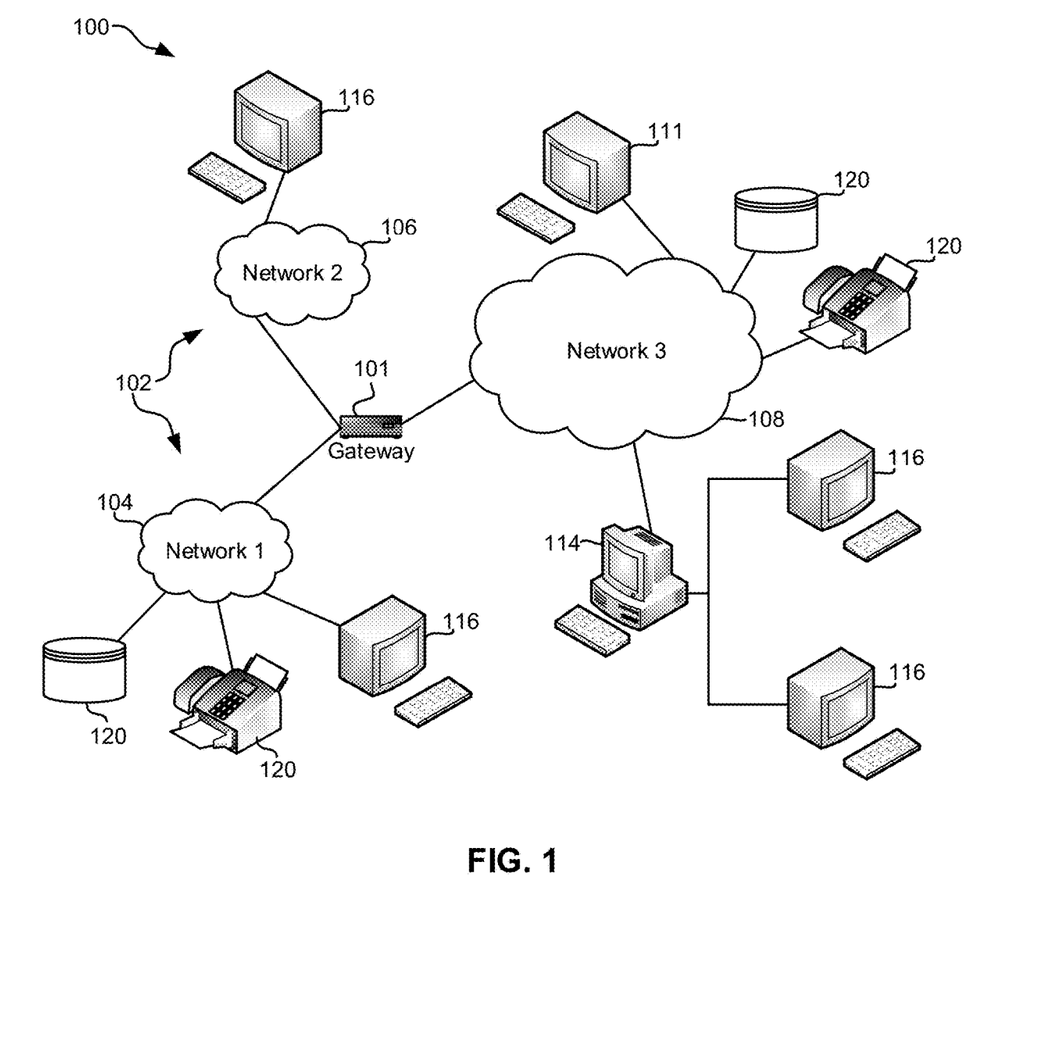
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
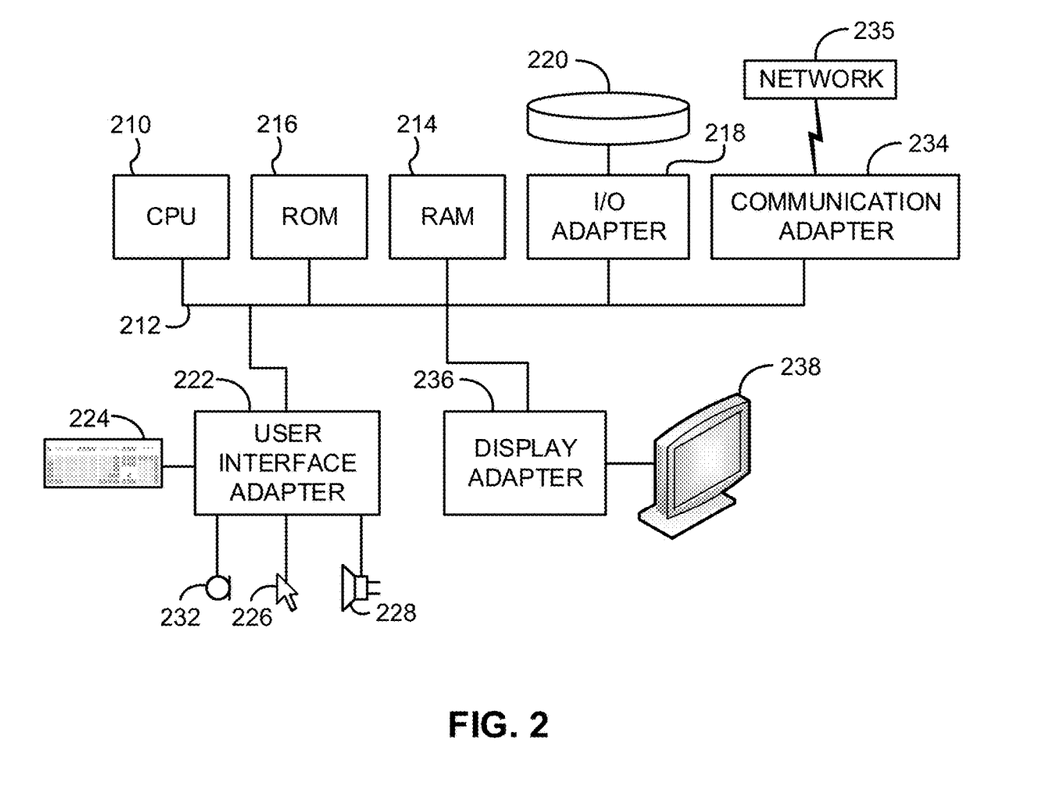
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
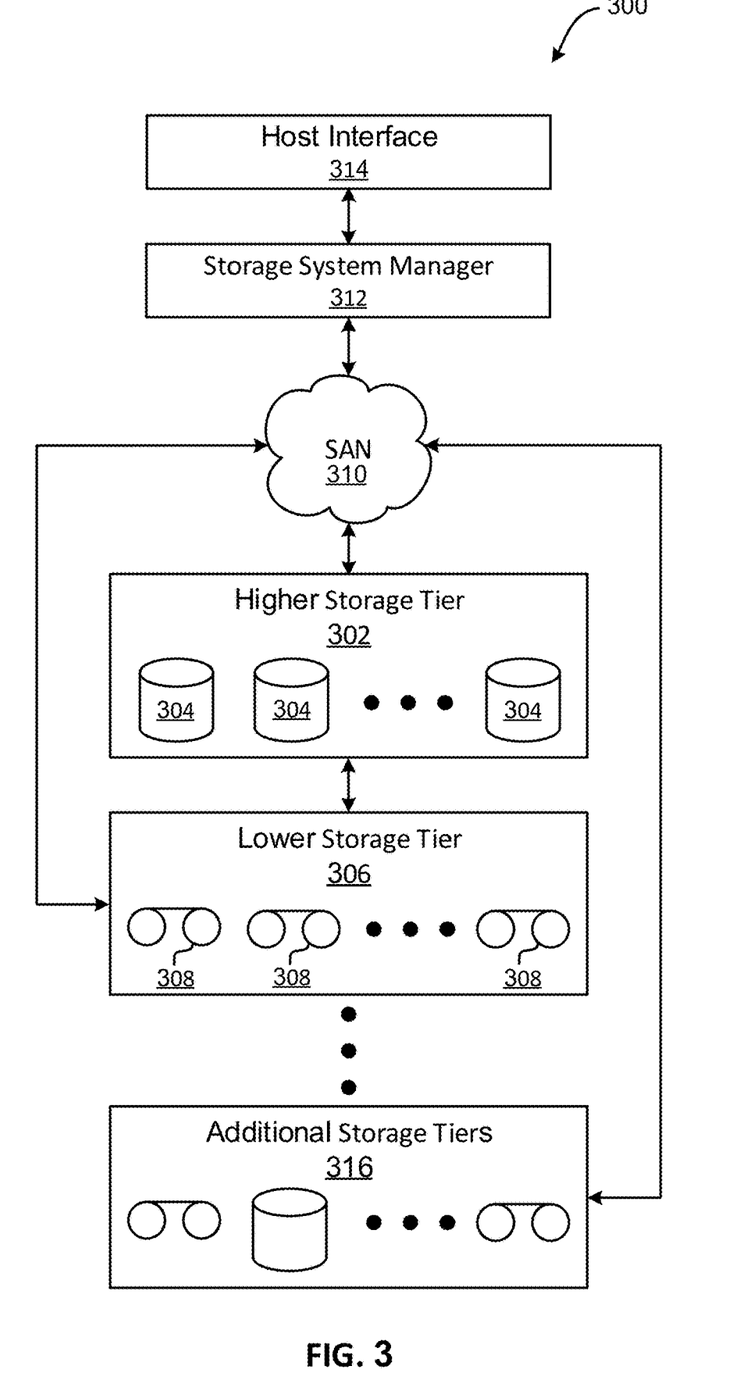
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
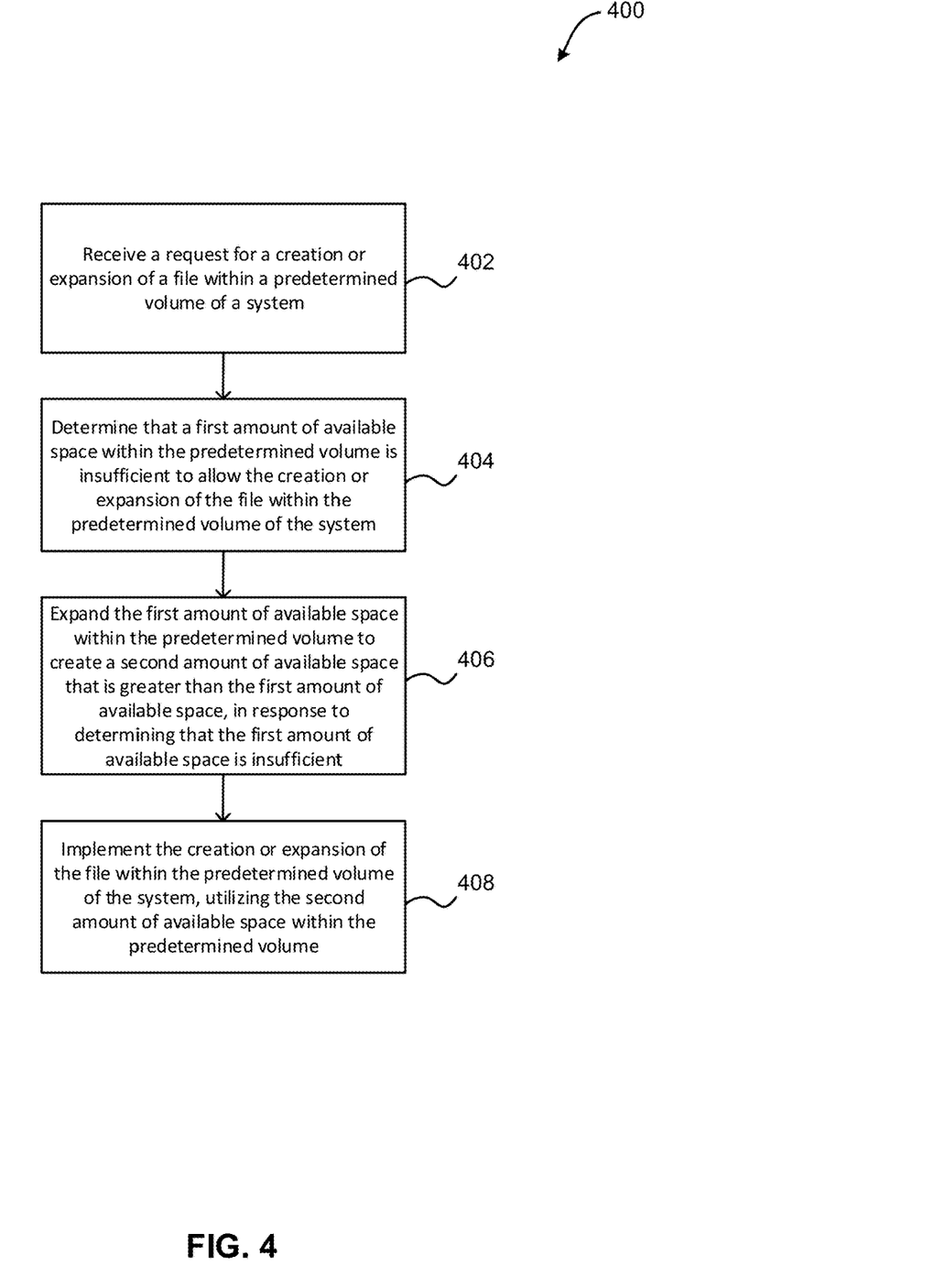
FIG. 4 illustrates a method for dynamically increasing available storage space in a storage volume, in accordance with one embodiment.

Now referring to FIG. 4, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a request is received for a creation or expansion of a file within a predetermined volume of a system. In one embodiment, the system may include a storage system containing one or more storage volumes. In another embodiment, the system may include one or more of a distributed storage system, a cloud-based storage system, a virtual storage environment, a multi-tiered storage, etc.

Additionally, in one embodiment, the request may be received by an operating system (OS) of the system, from one or more applications of the system, or via a batch job sent to the system, according to one or more known means. For example, the operating system may receive a request to create or expand the file within the predetermined volume. In another embodiment, the request may include a job that is sent manually by a user to the operating system for implementation. In yet another embodiment, the request may include a job that is sent in real-time by an application running within a system (e.g., a database application attempting to create or extend a file, etc.) to the operating system for implementation.

Further, in one embodiment, the request may be received as part of a plurality of requests (e.g., within a batch). IN another embodiment, the expansion of the file may include an addition of data to an existing file within the predetermined volume. For example, the file may include a database file, and the expansion of the file may include the addition of data (e.g., database rows, database columns, database entries, etc.) to the database file.

Further still, in one embodiment, the volume of the system may include a predetermined storage area within the system. For example, the volume may include a storage volume such as a physical storage volume, a logical storage volume, etc.

Also, method 400 may proceed with operation 404, where it is determined that a first amount of available space within the predetermined volume is insufficient to allow the creation or expansion of the file within the predetermined volume of the system. In one embodiment, the first amount of available space may include a total amount of unused space currently available within the predetermined volume.

In addition, in one embodiment, the first amount of available space may be identified by the operating system of the system. For example, the operating system of the system may analyze the predetermined volume of the system using one or more known techniques in order to determine a total amount of unused space that is currently available within the system. In another embodiment, the first amount of available space may be identified by the operating system in response to the request for the creation or expansion of the file within the predetermined volume.

Furthermore, in one embodiment, the first amount of available space within the predetermined volume may be determined to be insufficient to allow the creation or expansion of the file within the predetermined volume of the system when the first amount of available space is determined by the operating system to be smaller than a size of data associated with the creation or expansion of the file. In another embodiment, the operating system may identify an amount of storage space necessary to implement the creation or expansion of the file. For example, the request for creation or expansion of the file may be analyzed using one or more known techniques in order to determine an amount of storage space necessary to perform the creation or expansion.

Further still, in one embodiment, the identified amount of storage space necessary to implement the creation or expansion of the file may be compared to the first amount of available space within the predetermined volume. In another embodiment, the first amount of available space within the predetermined volume may be determined to be insufficient to allow the creation or expansion of the file within the predetermined volume of the system in response to determining that the identified amount of storage space necessary to implement the creation or expansion of the file is greater than the first amount of available space within the predetermined volume.

Also, method 400 may proceed with operation 406, where the first amount of available space within the predetermined volume is expanded to create a second amount of available space that is greater than the first amount of available space, in response to determining that the first amount of available space is insufficient. In one embodiment, the first amount of available space within the predetermined volume may be expanded by the operating system according to one or more techniques indicated in the request for the creation or expansion of a file within a predetermined volume of a system. For example, the request may include a keyword that provides authorization and instructions to the operating system to perform one or more actions to expand the first amount of available space within the predetermined volume.

Additionally, in one embodiment, the first amount of available space within the predetermined volume may be expanded according to a first exemplary technique by automatically formatting the predetermined volume. For example, the entire predetermined volume may be formatted by the operating system. In another embodiment, the first amount of available space within the predetermined volume may be expanded by automatically identifying another uninitialized volume, and automatically formatting the other uninitialized volume to create a new initialized volume.

For example, a volume table of contents (VTOC) may be added to the uninitialized volume. In another example, a catalog may also be dynamically updated to integrate the new initialized volume with the original predetermined volume.

Further, in one embodiment, the first amount of available space within the predetermined volume may be expanded by automatically formatting the predetermined volume in response to a predetermined keyword included in the request for the creation or expansion of a file within a predetermined volume of a system (e.g., a "FORMAT" keyword, etc.).

Further still, in one embodiment, the first amount of available space within the predetermined volume may be expanded according to a second exemplary technique by automatically deleting one or more predetermined files within the predetermined volume. For example, the operating system may automatically delete one or more predetermined files within the predetermined volume.

Also, in one embodiment, the first amount of available space within the predetermined volume may be expanded by automatically deleting one or more predetermined files within the predetermined volume in response to a predetermined keyword included in the request for the creation or expansion of a file within a predetermined volume of a system (e.g., a "DELETE" keyword, etc.). In another embodiment, the one or more predetermined files may be indicated within the request for the creation or expansion of a file within a predetermined volume of a system.

For example, one or more parameters within the "DELETE" keyword may indicate one or more predetermined files to be deleted in response to determining that the first amount of available space is insufficient. In another example, one or more parameters within the "DELETE" keyword may indicate a predetermined file name mask, where files matching the file name mask are to be deleted in response to determining that the first amount of available space is insufficient. In yet another example, the operating system may delete the one or more predetermined files indicated within the request.

In addition, in one embodiment, the first amount of available space within the predetermined volume may be expanded according to a third exemplary technique by automatically migrating one or more selected files within the predetermined volume. For example, one or more selected files may be currently stored within the predetermined volume. In another example, the one or more selected files may be migrated to another storage volume, another storage tier, another storage device (e.g., a tape, cloud storage, etc.), etc.

Furthermore, in one embodiment, the one or more selected files may be selected by comparing metadata associated with all files currently stored within the predetermined volume to predetermined criteria. For example, the predetermined criteria may include a threshold heat value (where the heat value indicated predetermined data usage), a threshold access time, etc. In another embodiment, all files currently stored within the predetermined volume that are determined to have metadata below the predetermined criteria may be selected as the selected files.

For example, all files having a heat value below a threshold heat value may be selected to be migrated. In another example, all files having a last access time before a threshold access time may be selected to be migrated.

Further still, in one embodiment, the operating system may automatically migrate files within the predetermined volume (e.g., starting with least recently used files and ascending in order of file usage, etc.) until space to allow the creation or expansion of the file within the predetermined volume of the system is obtained. In another embodiment, the operating system may automatically migrate files within the predetermined volume (e.g., starting with least recently used files and ascending in order of file usage, etc.) until space to allow the creation or expansion of the file within the predetermined volume of the system, as well as a buffer (e.g., an additional predetermined percentage of available space within the predetermined volume, etc.) is obtained.

Also, in one embodiment, the first amount of available space within the predetermined volume may be expanded by automatically migrating one or more selected files within the predetermined volume in response to a predetermined keyword included in the request for the creation or expansion of a file within a predetermined volume of a system (e.g., a "MIGRATE" keyword, etc.).

Additionally, in one embodiment, the first amount of available space within the predetermined volume may be expanded according to a fourth exemplary technique by dynamically expanding the predetermined volume. For example, the predetermined volume may include a logical volume, and the operating system may dynamically expand the predetermined volume by assigning/provisioning space from a free data pool to the predetermined volume. In another embodiment, first amount of available space within the predetermined volume may be expanded by dynamically expanding the predetermined volume in response to a predetermined keyword included in the request for the creation or expansion of a file within a predetermined volume of a system (e.g., a "EXPANDVOLUME" keyword, etc.).

Further, in one embodiment, the first amount of available space within the predetermined volume may be expanded by the operating system according to one or more techniques indicated in metadata associated with the file to be created or expanded. For example, the file to be created or expanded may be associated with a data class. In another example, the data class may include one or more policies that provides authorization and instructions to the operating system to perform one or more actions to expand the first amount of available space within the predetermined volume.

Further still, in one embodiment, a plurality of techniques to expand the first amount of available space within the predetermined volume may be implemented in a predetermined order until space to allow the creation or expansion of the file within the predetermined volume of the system is obtained. For example, the predetermined order, as well as the plurality of techniques, may be described within the metadata associated with the file to be created or expanded.

Also, in one embodiment, the metadata associated with the file to be created or expanded may be referenced by the operating system. In another embodiment, the metadata may indicate that, in response to determining that the first amount of available space is insufficient, a plurality of techniques are to be performed in a predetermined order until space to allow the creation or expansion of the file within the predetermined volume of the system is obtained.

In addition, in one embodiment, exemplary techniques may include the techniques described above (e.g., automatically formatting the predetermined volume, automatically deleting one or more predetermined files within the predetermined volume, automatically migrating one or more selected files within the predetermined volume, dynamically expanding the predetermined volume, etc.). In another embodiment, the second amount of available space may include a combination of the first amount of available space and the space created utilizing one or more of the above exemplary techniques.

Furthermore, method 400 may proceed with operation 408, where the creation or expansion of the file is implemented within the predetermined volume of the system, utilizing the second amount of available space within the predetermined volume. In one embodiment, the file may be created or expanded by the operating system using one or more known techniques, where data associated with the creation or expansion may be stored utilizing the second amount of available space within the predetermined volume.

In this way, the creation or expansion of the file may be dynamically enabled within the predetermined volume of a system by the operating system. This may prevent a failure of an application that sent the creation or expansion request (e.g., due to lack of available space for the file creation/expansion, etc.), and may therefore improve a performance of the application and an operating system facilitating the application, as well as a computing device running the application and the operating system.

Volume Space Constraint Relief

Currently, when a user defines or extends a file (e.g., a data set, etc.) within a selected volume, if the selected volume is full or does not have enough space to fulfill the requested space, the data set create or extend request will fail.

In order to complete those actions on a computer system, a data set may be required to be allocated on the selected volume. Unless a user can wait for a storage administrator to add more volumes into the system or migrate data sets off the selected volume, those important activities or transactions will not be finished and would be costly.

In one example, migration actions may be done automatically. However, those migration actions will be carried out at an interval or at a scheduled time. Besides that, the migration policies can be set up incorrectly by a storage administrator. Those migration actions may not be carried out immediately at an unexpected critical time.

In another example, there are functions to add a volume to an existing data set automatically to allow the data set to be extended. However, those functions work only when there are available online volumes in a storage group. And, the data set is allowed to be a multi-volume data set. Otherwise, the data set extend will fail.

In yet another example, there are no functions to add a volume to a storage group automatically for a new data set to be created when all the volumes in the selected storage groups are full or do not have enough space to fulfill the requested space.

One exemplary goal is to resolve the volume space shortage at a critical time when an important activity or transaction requires to have a data set allocated successfully in order to be completed without requiring an immediate action from a storage administrator.

In one embodiment, volume space constraint relief may be performed when there is a need to allocate a data set on a selected volume or volumes before a storage administrator adds more volumes into the system or migrates data sets off the selected volume or volumes.

In one embodiment, when the definition or extension of a data set fails because of an out-of-space error on a selected volume or volumes, one or more volume space constraint relief solutions may be used.

Formatting the Selected Volume

In one embodiment, the selected volume may be formatted. For example, all the contents on that volume may be deleted. The volume will then be reinitialized. Table 1 illustrates an exemplary job request sent to an operating system for implementation (e.g., to initialize a file) that authorizes volume formatting.

TABLE 1

//NVSAM01 DD DSN=ALLOC01 .DS01 ,DISP,(NEW,KEEP),
// SPACE=(TRK,(15,1), FORMAT),STORCLAS=S1 P02S02,
// DATACLAS=PS000000,
// VOL=SER=(1 P0201)
DEFINE CLUSTER -
(-
NAME(DEFESDS4.ESDS) -
VOLUMES(1 P0201) -
STORAGECLASS(S1 P03S01)-
DATACLASS(ES000009) -
NONINDEXED -
TRACKS(15 1)-
FORMAT -
)

As shown in Table 1, the "FORMAT" keyword indicates that a volume is to be re-formatted if the volume runs out of storage. For example, the OS may be given permission to format the volume if the target volume runs out of space during the definition or extension of a data set.

Deleting Specific Data Sets within the Selected Volume

In one embodiment, a specific data set or a set of data sets with a specified mask (regular expression) on the selected volume may be deleted. Table 2 illustrates an exemplary job request sent to an operating system for implementation (e.g., to initialize a file) that authorizes specific data deletion.

TABLE 2

//NVSAM01 DD DSN=ALLOC01.DS01,DISP=(NEW,KEEP),
// SPACE=(TRK,(15,1), DELETE(A.B.C)),STORCLAS=S1 P02S02,
// DATACLAS=PS000Q00,
// VOL=SER=(1 P0201)
DEFINE CLUSTER -
(-
NAME(DEFESDS4.ESDS) -
VOLUMES(1 P0201) -
STORAGECLASS(S1 P03S01)-
DATACLASS(ES000009) -
NONINDEXED -
TRACKS(15 1)-
DELETE(A.B.C) -
)

As shown in Table 2, the "DELETE" keyword indicates that only the data set "A.B.C" is to be deleted if the volume runs out of storage.

Table 3 illustrates an exemplary job request sent to an operating system for implementation (e.g., to initialize a file) that authorizes masked data deletion.

TABLE 3

//NVSAM01 DD DSN=ALLOC01.DS01,DISP=(NEW,KEEP),
// SPACE=(TRK,(15,1), DELETE(A.*)),STORCLAS=S1 P02S02,
// DATACLAS=PS000000,
// VOL=SER=(1 P0201)
DEFINE CLUSTER -
(-
NAME(DEFESDS4.ESDS) -
VOLUMES(1 P0201) -
STORAGECLASS(S1 P03S01)-
DATACLASS(ES000009) -

TABLE 3-continued

NONINDEXED -
TRACKS (15 1)-
DELETE (A.*) -
)

As shown in Table 3, the "DELETE" keyword indicates that all the data sets beginning with "A." are to be deleted if the volume runs out of storage.

Migrating LRU Data Sets

In one embodiment, the Least Recently Used (LRU) data sets may be migrated off the selected volume to a media or any volumes based on the migration rule in the system configuration. Table 4 illustrates an exemplary job request sent to an operating system for implementation (e.g., to initialize a file) that authorizes LRU data migration off a selected volume until a requested space is satisfied.

TABLE 4

//NVSAM01 DD DSN=ALLOC01.DS01,DISP=(NEW,KEEP),
// SPACE=(TRK,(15,1), MIGRATE),ST0RCLAS=S1 P02S02,
// DATACLAS=PS000000,
// VOL=SER=(1 P0201)
DEFINE CLUSTER -
( -
NAME(DEFESDS4.ESDS) -
VOLUMES(1 P0201) -
STORAGECLASS(S1 P03S01)-
DATACLASS(ES000009) -
NONINDEXED -
TRACKS(15 1) -
MIGRATE -
)

As shown in Table 4, the "MIGRATE" keyword indicates that LRU data is migrated out of the volume until an amount of space needed for data creation/expansion is obtained within that volume.

Table 5 illustrates an exemplary job request sent to an operating system for implementation (e.g., to initialize a file) that authorizes LRU data migration off a selected volume until a total size of migrated data is equal to or greater than the requested data size, plus a predetermined percentage (in this case, 10%).

TABLE 5

//NVSAM01 DD DSN=ALLOC01.DS01,DISP=(NEW,KEEP),
// SPACE=(TRK,(15,1), MIGRATE(10)),STORCLAS=S1 P02S02,
// DATACLAS=PS000000,
// VOL=SER=(1 P0201)
DEFINE CLUSTER -
( -
NAME(DEFESDS4.ESDS) -
VOLUMES(1 P0201) -
STORAGECLASS(S1 P03S01)-
DATACLASS(ES000009) -
NONINDEXED -
TRACKS(15 1) -
MIGRATE(10) -
)

As shown in Table 5, the "MIGRATE" keyword indicates that LRU data is migrated out of the volume until an amount of space needed for data creation/expansion, as well as an extra 10% of that needed space, is obtained within that volume.

Dynamically Expanding the Volume

In one embodiment, the selected volume may be dynamically expanded. For example, additional space may be made available for new allocations. This may require a new command to the device in order to configure additional space for this volume. Once the volume is expanded, the file directory may be refreshed to be able to satisfy the new allocation request.

Table 6 illustrates an exemplary job request sent to an operating system for implementation (e.g., to initialize a file) that authorizes dynamic volume expansion.

TABLE 6

```
//NVSAM01 DD DSN=ALLOC01.DS01,DISP,(NEW,KEEP),
// SPACE=(TRK,(15,1), EXPANDVOLUME),STORCLAS=S1P02S02,
// DATACLAS=PS000000,
// VOL=SER=(1P0201)
DEFINE CLUSTER -
( -
NAME(DEFESDS4.ESDS) -
VOLUMES(1P0201) -
STORAGECLASS(S1P03S01) -
DATACLASS(ES000009) -
NONINDEXED -
TRACKS(15 1) -
EXPANDVOLUME -
)
```

As shown in Table 6, the "EXPANDVOLUME" keyword indicates that a volume is to be dynamically expanded if the volume runs out of storage.

"Must not Fail" Policy

In one embodiment, a "must not fail" policy may be defined in a data class to allow an installation to identify and prioritize the actions that the system should take when a data set with this data class needs additional space.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving, from an application running within a system, a request for an expansion of a file within a predetermined volume of the system, where the file includes a database file and the expansion includes an addition of data to the file within the system;
determining that a first amount of available space within the predetermined volume is insufficient to allow the expansion of the file within the predetermined volume of the system;
expanding the first amount of available space within the predetermined volume to create a second amount of available space that is greater than the first amount of available space, in response to determining that the first amount of available space is insufficient, including:
in response to determining a first predetermined keyword in the request, automatically formatting the predetermined volume of the system,
in response to determining a second predetermined keyword and an indication of a file name mask in the request, automatically deleting files matching the file name mask within the predetermined volume of the system,
in response to determining a third predetermined keyword in the request, automatically migrating files within the predetermined volume of the system, starting with least recently used files and ascending in order of file usage, until space to allow the expansion of the file within the predetermined volume of the system, as well as a buffer including an additional predetermined percentage of available space within the predetermined volume, is obtained within the predetermined volume of the system,
in response to determining a fourth predetermined keyword in the request, automatically provisioning space from a free data pool to the predetermined volume of the system; and
expanding the file within the predetermined volume of the system, utilizing the second amount of available space within the predetermined volume.

2. The computer-implemented method of claim 1, wherein the request includes a job that is sent in real-time by the application running within the system to an operating system for implementation.

3. The computer-implemented method of claim 1, wherein the first amount of available space includes a total amount of unused space currently available within the predetermined volume.

4. The computer-implemented method of claim 1, wherein the first amount of available space within the predetermined volume is determined to be insufficient to allow the expansion of the file within the predetermined volume of the system in response to determining that the first amount of available space is smaller than a size of data associated with the expansion of the file.

5. The computer-implemented method of claim 1, wherein the first amount of available space within the predetermined volume is expanded according to one or more techniques indicated in metadata associated with the file to be created or expanded.

6. The computer-implemented method of claim 1, wherein a plurality of techniques to expand the first amount of available space within the predetermined volume are implemented in a predetermined order until space to allow the expansion of the file within the predetermined volume of the system is obtained.

7. A computer program product for dynamically increasing available storage space in a storage volume, the computer program product comprising a computer readable storage medium having program instructions embodied therewith, wherein the computer readable storage medium is not a transitory signal per se, the program instructions executable by a processor to cause the processor to perform a method comprising:
  receiving, by the processor from an application running within a system, a request for an expansion of a file within a predetermined volume of the system, where the file includes a database file and the expansion includes an addition of data to the file within the system;
  determining, by the processor, that a first amount of available space within the predetermined volume is insufficient to allow the expansion of the file within the predetermined volume of the system;
  expanding, by the processor, the first amount of available space within the predetermined volume to create a second amount of available space that is greater than the first amount of available space, in response to determining that the first amount of available space is insufficient, including:
    in response to determining a first predetermined keyword in the request, automatically formatting the predetermined volume of the system,
    in response to determining a second predetermined keyword and an indication of a file name mask in the request, automatically deleting files matching the file name mask within the predetermined volume of the system,
    in response to determining a third predetermined keyword in the request, automatically migrating files within the predetermined volume of the system, starting with least recently used files and ascending in order of file usage, until space to allow the expansion of the file within the predetermined volume of the system, as well as a buffer including an additional predetermined percentage of available space within the predetermined volume, is obtained within the predetermined volume of the system,
    in response to determining a fourth predetermined keyword in the request, automatically provisioning space from a free data pool to the predetermined volume of the system; and
  expanding, by the processor, the file within the predetermined volume of the system, utilizing the second amount of available space within the predetermined volume.

8. The computer program product of claim 7, wherein the request includes a job that is sent in real-time by the application running within the system to an operating system for implementation.

9. The computer program product of claim 7, wherein the first amount of available space includes a total amount of unused space currently available within the predetermined volume.

10. The computer program product of claim 7, wherein the first amount of available space within the predetermined volume is determined to be insufficient to allow the expansion of the file within the predetermined volume of the system in response to determining that the first amount of available space is smaller than a size of data associated with the expansion of the file.

11. A system, comprising:
  a processor; and
  logic integrated with the processor, executable by the processor, or integrated with and executable by the processor, the logic being configured to:
  receive, from an application running within a system, a request for an expansion of a file within a predetermined volume of the system, where the file includes a database file and the expansion includes an addition of data to the file within the system;
  determine that a first amount of available space within the predetermined volume is insufficient to allow the expansion of the file within the predetermined volume of the system;
  expand the first amount of available space within the predetermined volume to create a second amount of available space that is greater than the first amount of available space, in response to determining that the first amount of available space is insufficient, including:
    in response to determining a first predetermined keyword in the request, automatically formatting the predetermined volume of the system,
    in response to determining a second predetermined keyword and an indication of a file name mask in the request, automatically deleting files matching the file name mask within the predetermined volume of the system,
    in response to determining a third predetermined keyword in the request, automatically migrating files within the predetermined volume of the system, starting with least recently used files and ascending in order of file usage, until space to allow the expansion of the file within the predetermined volume of the system, as well as a buffer including an additional predetermined percentage of available space within the predetermined volume, is obtained within the predetermined volume of the system,
    in response to determining a fourth predetermined keyword in the request, automatically provisioning space from a free data pool to the predetermined volume of the system; and
  expand the file within the predetermined volume of the system, utilizing the second amount of available space within the predetermined volume.

* * * * *